US012603104B2

(12) United States Patent
Minami et al.

(10) Patent No.: US 12,603,104 B2
(45) Date of Patent: Apr. 14, 2026

(54) DISK DEVICE WITH STOPPER FOR ACTUATOR ASSEMBLY

(71) Applicants: Kabushiki Kaisha Toshiba, Tokyo (JP); Toshiba Electronic Devices & Storage Corporation, Tokyo (JP)

(72) Inventors: Hiroshi Minami, Yokohama (JP); Shigeru Juman, Kawasaki (JP); Kouichi Toukairin, Kawasaki (JP); Yasuhiko Kato, Tokyo (JP); Hirofumi Kuribara, Tokyo (JP); Kenji Mizuochi, Kamakura (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/799,267

(22) Filed: Aug. 9, 2024

(65) Prior Publication Data

US 2025/0292791 A1     Sep. 18, 2025

(30) Foreign Application Priority Data

Mar. 15, 2024    (JP) ................................. 2024-041294

(51) Int. Cl.
*G11B 5/48*     (2006.01)
*G11B 5/54*     (2006.01)
*G11B 5/82*     (2006.01)

(52) U.S. Cl.
CPC .............. *G11B 5/4813* (2013.01); *G11B 5/54* (2013.01); *G11B 5/82* (2013.01)

(58) Field of Classification Search
None
See application file for complete search history.

(56) References Cited

U.S. PATENT DOCUMENTS

| | | | | |
|---|---|---|---|---|
| 4,777,549 A | | 10/1988 | Dushkes et al. | |
| 5,402,290 A | * | 3/1995 | Daniel ................... | G11B 21/22 |
| | | | | 360/265.1 |
| 5,864,449 A | * | 1/1999 | Dominguez, Jr. ..... | G11B 21/22 |
| | | | | 360/265.1 |
| 5,905,606 A | * | 5/1999 | Johnson ................... | G11B 5/54 |
| 6,028,744 A | * | 2/2000 | Amirkiai ................. | G11B 5/54 |
| 6,324,034 B1 | * | 11/2001 | Misso ....................... | G11B 5/54 |
| 7,133,249 B2 | | 11/2006 | Miyajima | |
| 7,564,647 B2 | | 7/2009 | Suwa et al. | |
| 9,990,948 B1 | * | 6/2018 | Kuribara .............. | G11B 5/5526 |

(Continued)

FOREIGN PATENT DOCUMENTS

| | | | |
|---|---|---|---|
| JP | H4-34232 B2 | 6/1992 | |
| JP | 2000-48537 A | 2/2000 | |

(Continued)

*Primary Examiner* — William J Klimowicz

(74) *Attorney, Agent, or Firm* — Kim & Stewart LLP

(57) ABSTRACT

According to one embodiment, a disk device includes a disk-shaped recording medium, an actuator assembly provided to be rotatable and supporting a magnetic head, and a first stopper and a second stopper, arranged contactable with the actuator assembly. At least one of the first stopper and the second stopper includes a cushioning member having a contact surface contactable with the actuator assembly, and a gas adsorption member provided to surround the cushioning member except for the contact surface.

7 Claims, 18 Drawing Sheets

(56)                    References Cited

U.S. PATENT DOCUMENTS

| | | | |
|---|---|---|---|
| 2005/0168867 A1 | 8/2005 | Miyajima | |
| 2007/0025015 A1 | 2/2007 | Suwa et al. | |
| 2013/0052416 A1* | 2/2013 | Wada ................. | C08G 18/7685 |
| | | | 428/141 |
| 2025/0046338 A1* | 2/2025 | Furuhashi .............. | G11B 5/314 |
| 2025/0087247 A1* | 3/2025 | Zaima ................. | G11B 33/146 |

FOREIGN PATENT DOCUMENTS

| | | | |
|---|---|---|---|
| JP | 2001-35131 A | 2/2001 | |
| JP | 4202939 B2 | 12/2008 | |
| JP | 4521329 B2 | 8/2010 | |
| JP | 2010-238344 A | 10/2010 | |

* cited by examiner

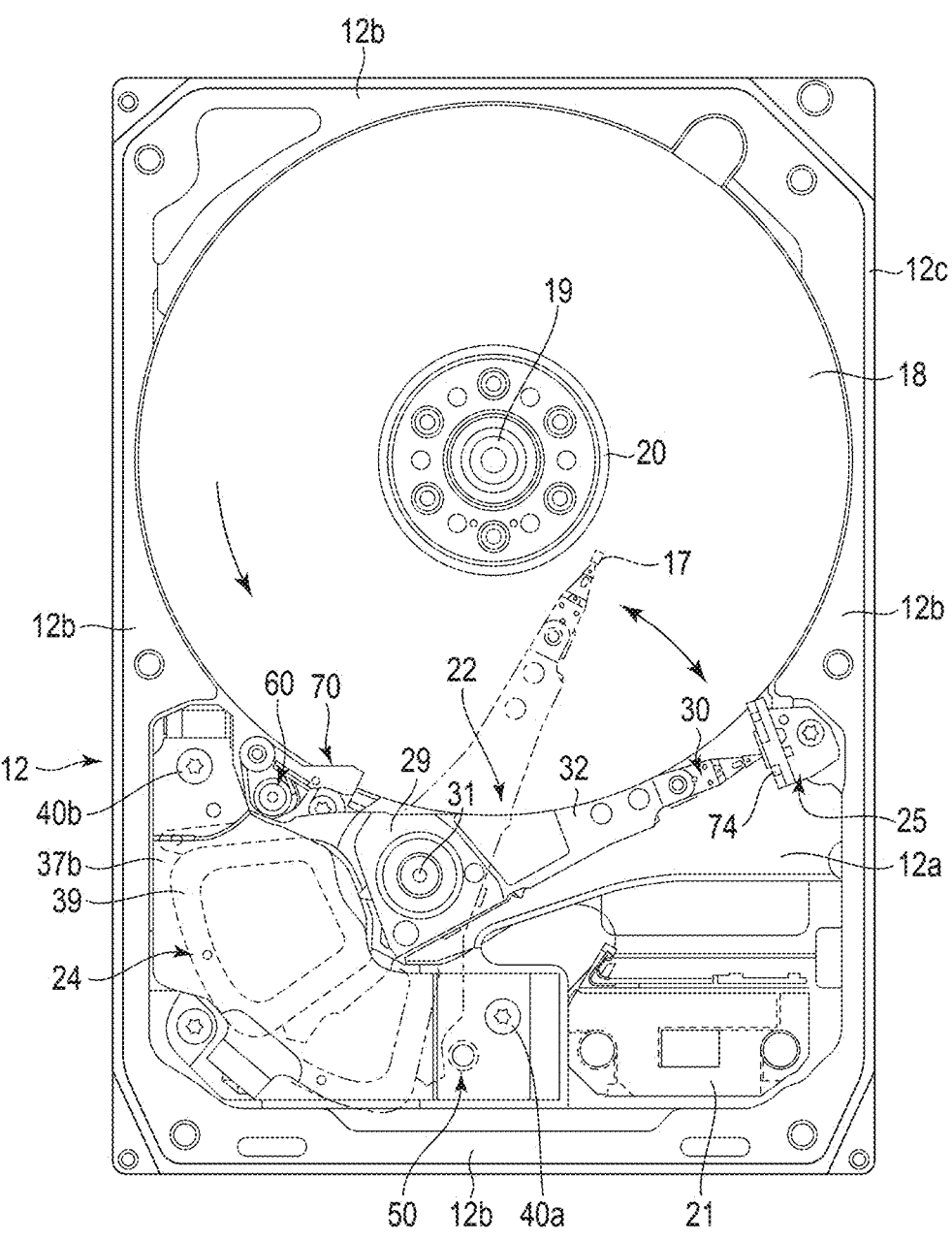
F I G. 2

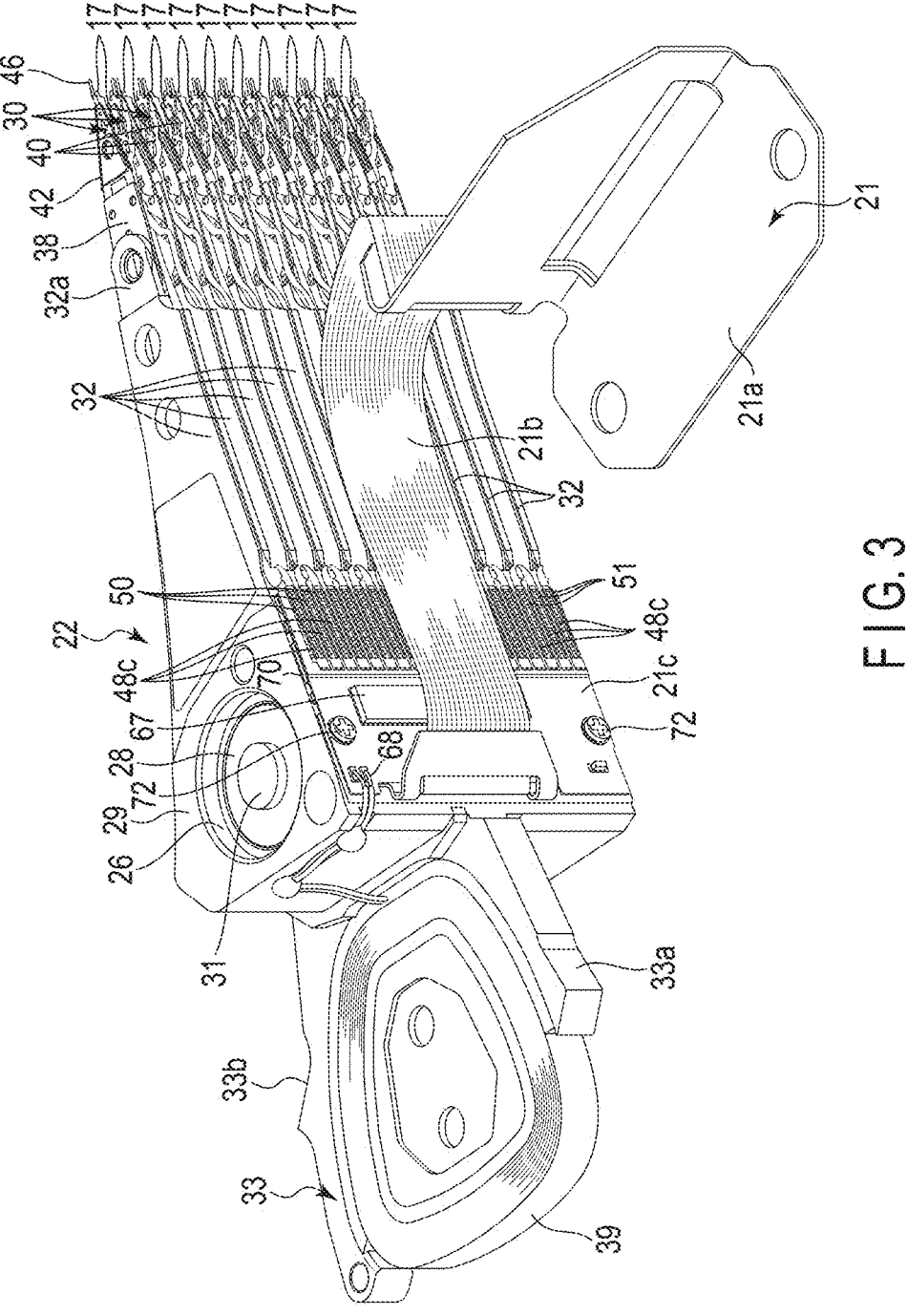
F I G. 3

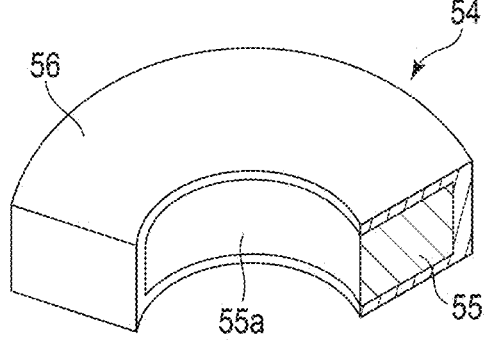
F I G. 7
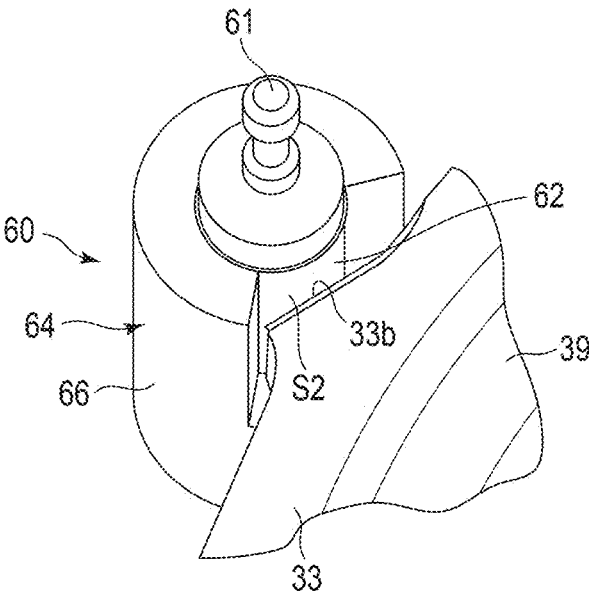
F I G. 8

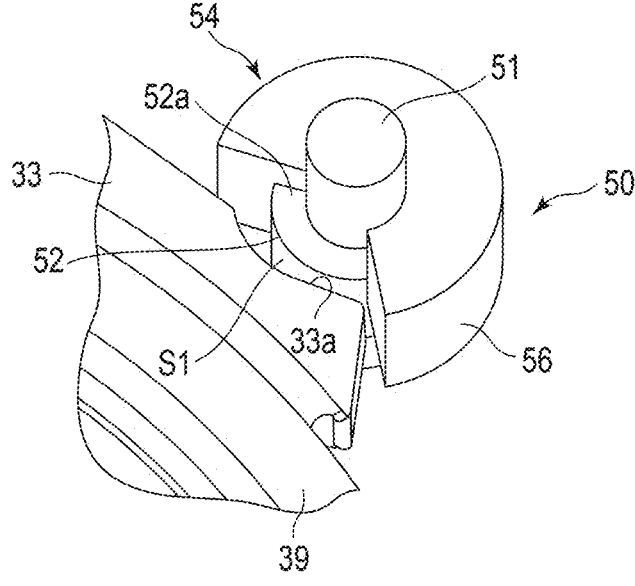
F I G. 11
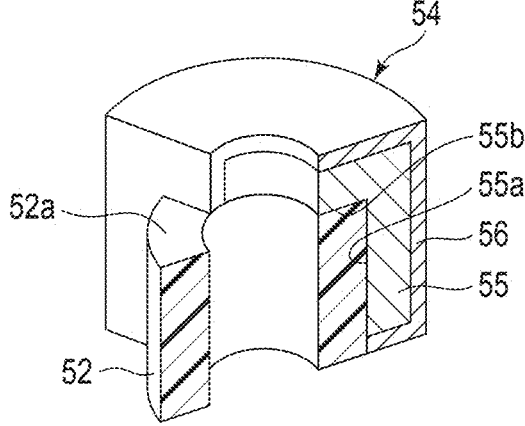
F I G. 12

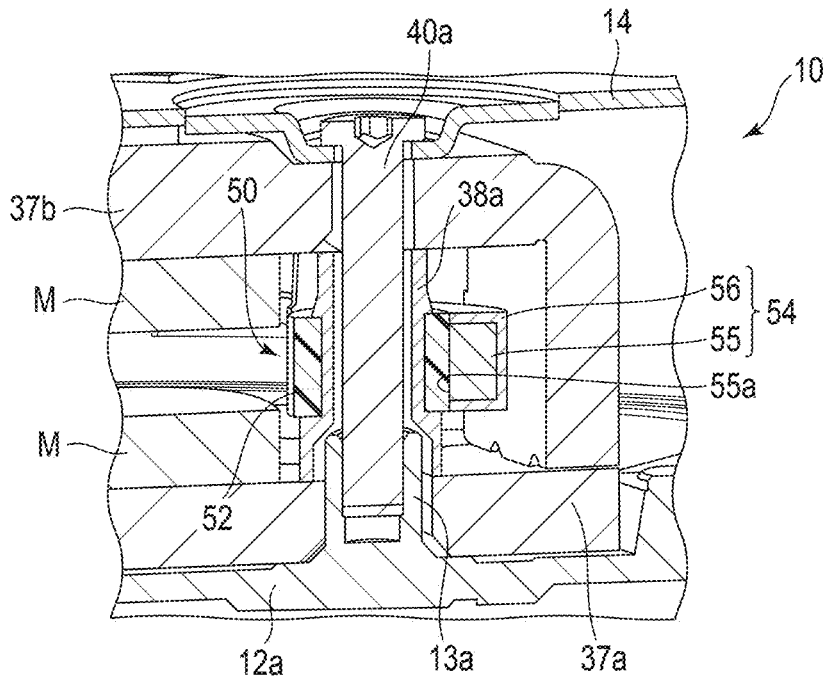
F I G. 17
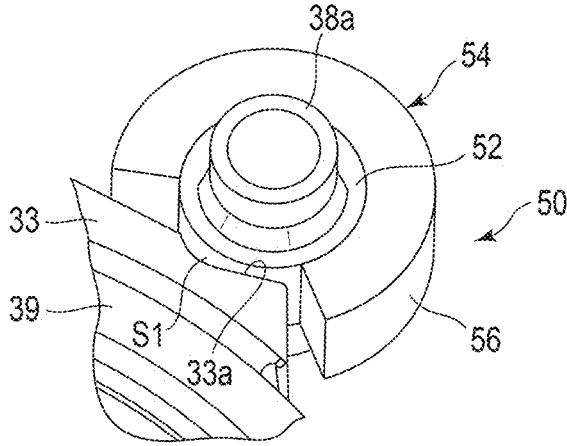
F I G. 18

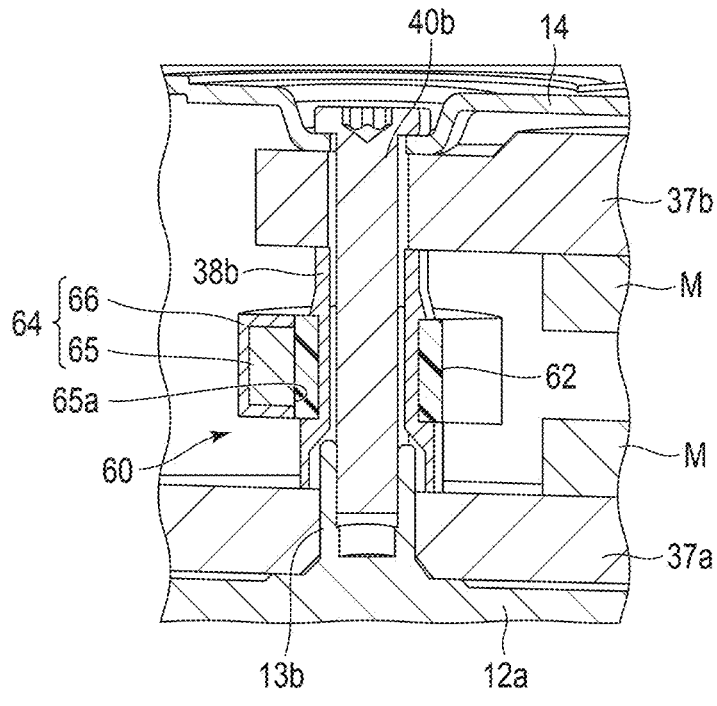
F I G. 19
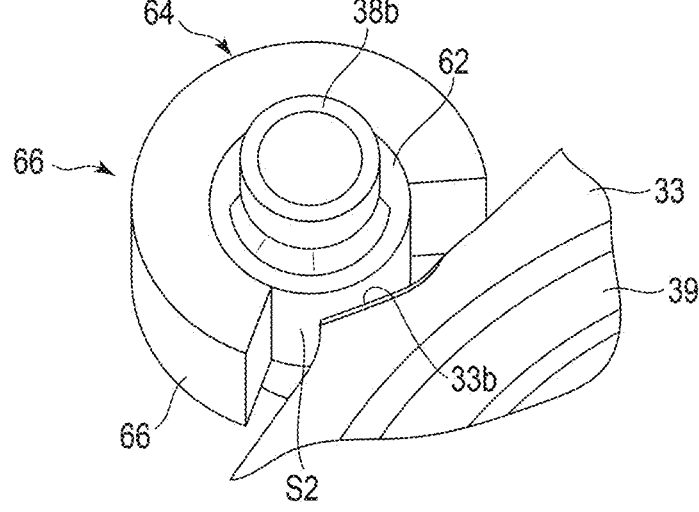
F I G. 20

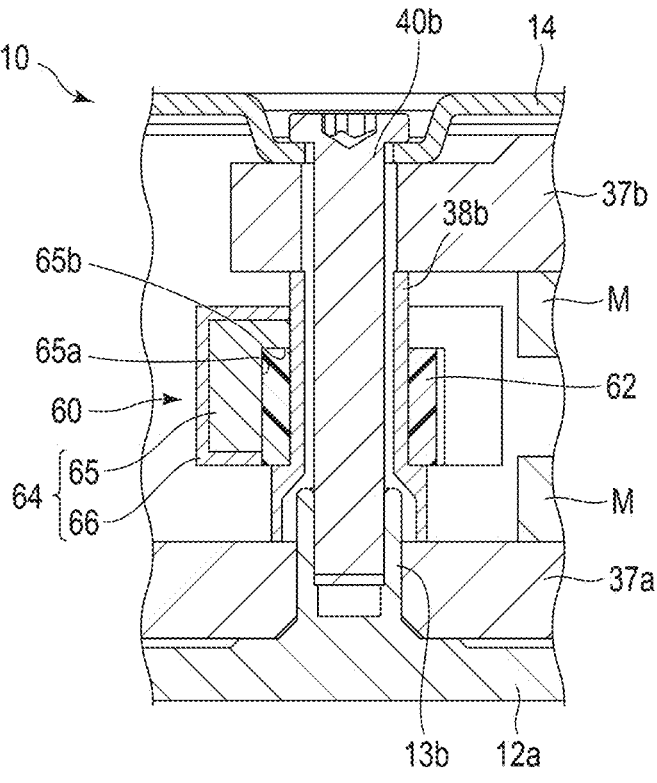
F I G. 23
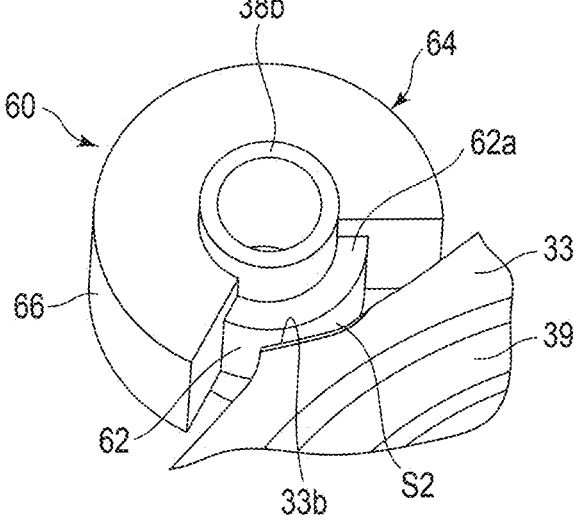
F I G. 24

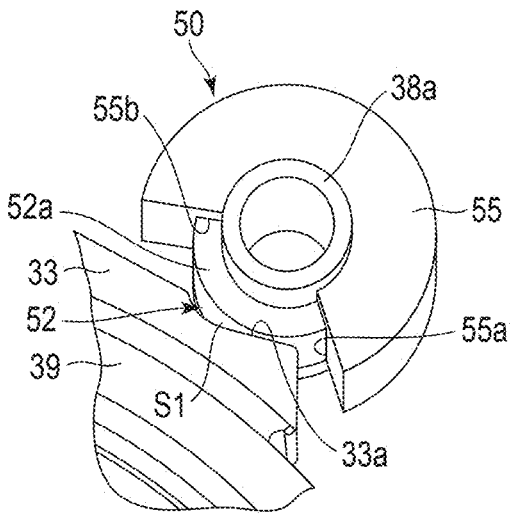
F I G. 27
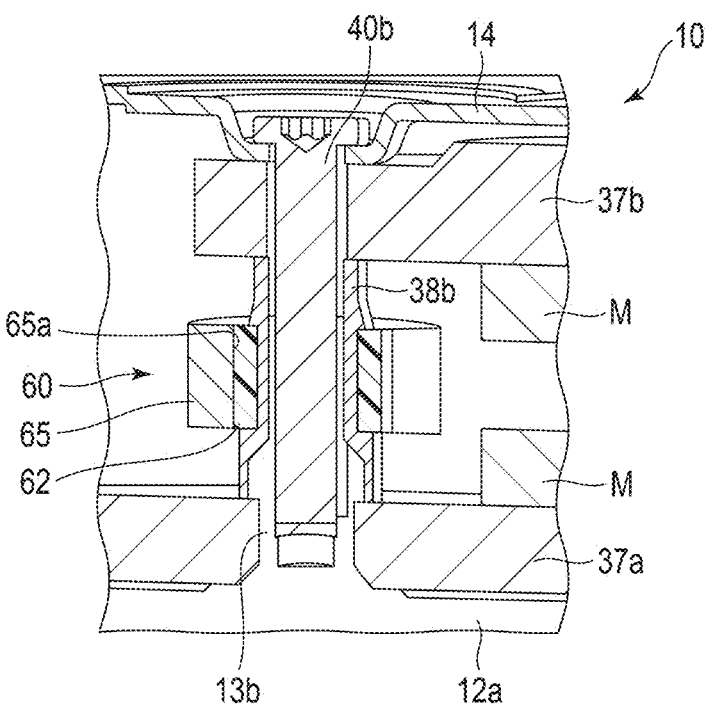
F I G. 28

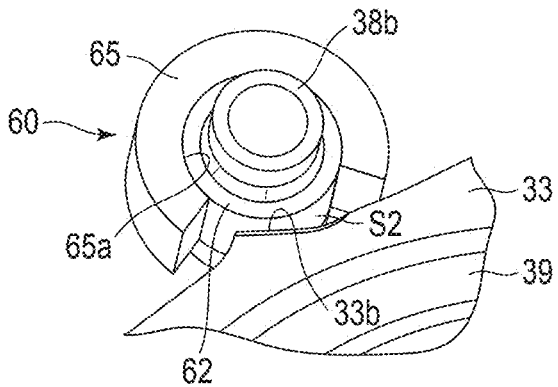
F I G. 29
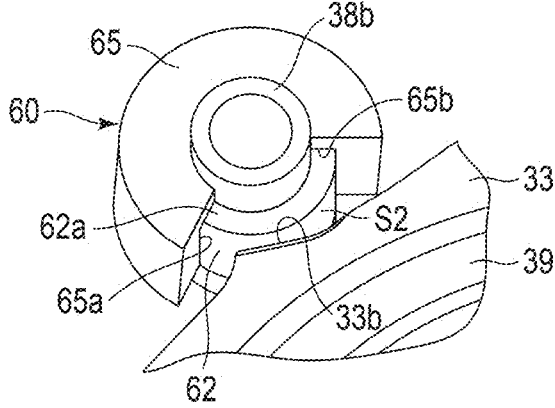
F I G. 30

| Stopper | Inner stopper | | Outer stopper | |
|---|---|---|---|---|
| Stopper holder | Stopper pin | Sleeve | Stopper pin | Sleeve |
| Example 11 | Adsorbent | x | Adsorbent | x |
| Example 12 | Adsorbent | x | Adsorbent + case | x |
| Example 13 | Adsorbent + case | x | Adsorbent | x |
| Example 14 | Adsorbent + case | x | Adsorbent + case | x |
| Example 15 | x | Adsorbent | x | Adsorbent |
| Example 16 | x | Adsorbent | x | Adsorbent + case |
| Example 17 | x | Adsorbent + case | x | Adsorbent |
| Example 18 | x | Adsorbent + case | x | Adsorbent + case |
| Example 19 | Adsorbent | x | x | Adsorbent |
| Example 20 | Adsorbent | x | x | Adsorbent + case |
| Example 21 | Adsorbent + case | x | x | Adsorbent |
| Example 22 | Adsorbent + case | x | x | Adsorbent + case |
| Example 23 | x | Adsorbent | Adsorbent | x |
| Example 24 | x | Adsorbent | Adsorbent + case | x |
| Example 25 | x | Adsorbent + case | Adsorbent | x |
| Example 26 | x | Adsorbent + case | Adsorbent + case | x |

F I G. 31

DISK DEVICE WITH STOPPER FOR ACTUATOR ASSEMBLY

CROSS-REFERENCE TO RELATED APPLICATIONS

This application is based upon and claims the benefit of priority from Japanese Patent Application No. 2024-041294, filed Mar. 15, 2024, the entire contents of which are incorporated herein by reference.

FIELD

Embodiments described herein relate generally to a disk device.

BACKGROUND

As a magnetic disk device, for example, a hard disk drive (HDD) comprises rotatable magnetic disks and a rotatable actuator assembly (which may as well be referred to as a head suspension assembly (HSA)) that supports magnetic heads, in an housing. The housing is provided with an inner stopper and an outer stopper that limit the range of movement of the actuator assembly.

To mitigate the impact created when the actuator assembly collides the stoppers, each of the inner stopper and outer stopper is prepared with a cushioning member, such as an elastic rubber or elastomer.

On the other hand, rubber and elastomers as cushioning members may outgas their components. The components outgassed from these materials can diffuse inside the HDD over a long period of time and accumulate on the magnetic heads and magnetic disks, which may cause a failure in the operation of the HDD.

As a countermeasure against outgassing, a filter or the like containing a gas adsorbing material such as activated carbon is installed inside the housing. Usually, the filter is installed at a distance from the stoppers. Therefore, it is difficult for the above-described filter or the like to sufficiently collect the outgassed particles generated from the stoppers.

BRIEF DESCRIPTION OF THE DRAWINGS

FIG. 2 is a plan view of the HDD.

FIG. 3 is a perspective view showing a head actuator assembly and an FPC unit of the HDD.

FIG. 7 is a partially exploded perspective view showing a adsorption unit of the inner stopper.

FIG. 8 is a perspective view showing an outer stopper.

FIG. 11 is a perspective view showing an inner stopper of an HDD according to the second embodiment.

FIG. 12 is a partially exploded perspective view showing a cushioning member and a adsorption unit of the inner stopper.

FIG. 17 is a cross-sectional view of an HDD according to the seventh embodiment, illustrating an inner stopper portion.

FIG. 18 is a perspective view showing the inner stopper of the seventh embodiment.

FIG. 19 is a cross-sectional view of the HDD of the seventh embodiment, illustrating an outer stopper portion of the HDD.

FIG. 20 is a perspective view showing the outer stopper of the seventh embodiment.

FIG. 23 is a cross-sectional view of the HDD according to the eighth embodiment, illustrating an outer stopper portion of the HDD.

FIG. 24 is a perspective view showing the outer stopper of the eighth embodiment.

FIG. 27 is a perspective view showing an inner stopper of the tenth embodiment.

FIG. 28 is a cross-sectional view of the HDD according to the ninth embodiment, illustrating an outer stopper portion of the HDD.

FIG. 29 is a perspective view showing the outer stopper of the ninth embodiment.

FIG. 30 is a perspective view showing an outer stopper of an HDD according to the tenth embodiment.

FIG. 31 is a table diagram showing examples of combinations of other embodiments 11 to 26.

DETAILED DESCRIPTION

Various embodiments will be described hereinafter with reference to the accompanying drawings. In general, according to one embodiment, a disk device comprises a disk-shaped recording medium, an actuator assembly provided to be rotatable and supporting a magnetic head, and a first stopper and a second stopper, arranged contactable with the actuator assembly. At least one of the first stopper and the second stopper includes a cushioning member having a contact surface contactable with the actuator assembly, and a gas adsorption member provided to surround the cushioning member except for the contact surface.

Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

Figure 1:
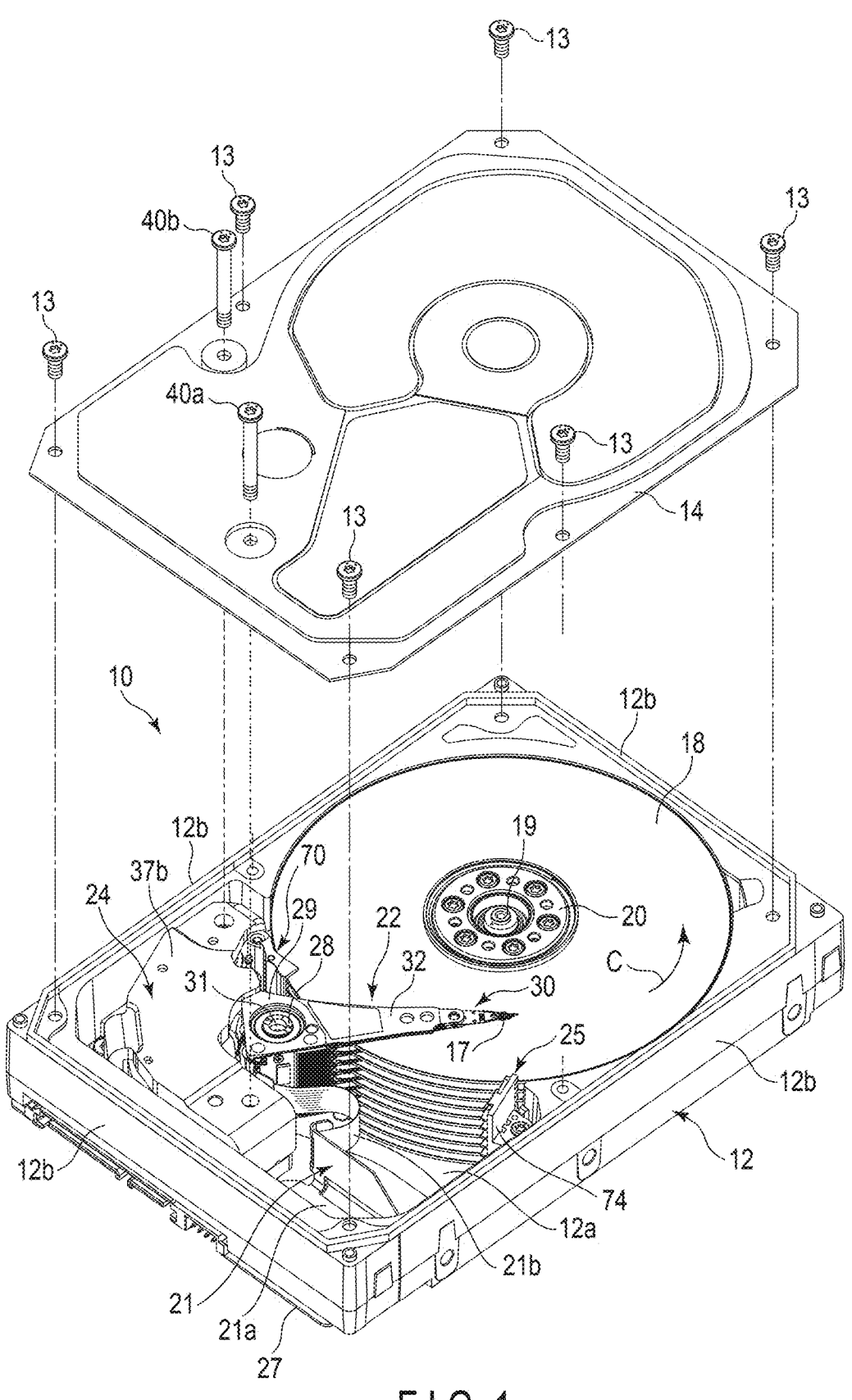
FIG. 1 is an exploded perspective view showing a hard disk drive (HDD) according to the first embodiment, when a top cover thereof disassembled.

As a disk device, a hard disk drive (HDD) according to the first embodiment will be described in detail. FIG. 1 is a perspective view of the HDD of the first embodiment, when a cover thereof is removed, and FIG. 2 is a plan view of the HDD when the cover is removed.

As shown in FIG. 1, the HDD comprises a substantially rectangular-shaped housing 10, the housing 10 has a rectangular box-shaped base 12 with an open top surface and a cover (top cover) 14 that is screwed to the base 12 with a plurality of screws 13 to close the top opening of the base 12. The base 12 includes a rectangular bottom wall 12a opposing the cover 14 with a gap therebetween, and side walls 12b formed to stand along peripheral edges of the bottom wall 12a, which are molded to be integrated as one body, for example, from an aluminum alloy. The side walls 12b include a pair of long side walls opposing each other and a pair of short side walls opposing each other. The cover 14 is formed into a rectangular plate shape, for example, from stainless steel. The cover 14 is screwed to the top surface of the side walls 12b by screws 13 at its peripheral edge portions.

Inside the housing 10, there are a plurality of, for example, ten magnetic disks 18 provided as disk-shaped recording media, and a spindle motor that supports and rotates the magnetic disks 18. The spindle motor 19 is disposed on the bottom wall 12a. The magnetic disks 18 are each formed as a discoidal plate having, for example, 96 mm (3.5 inches) in diameter, and include a substrate made of a nonmagnetic material, for example, glass or aluminum, and a magnetic recording layer formed on each of an upper surface (first surface) and a lower surface (second surface) of the substrate. In one example, an aluminum substrate is used. The magnetic disks 18 are fitted to the hub of the spindle motor 19 coaxially with respect to each other and are further cramped clamped by a clamping spring 20. With this configuration, the magnetic disks 18 are supported in respective positions parallel to the bottom wall 12a of the base 12. The magnetic disks 18 are rotated by the spindle motor 19 in the direction of arrow C at a predetermined rotation speed. The number of magnetic disks 18 mounted is not limited to ten, but may be nine or fewer, or eleven or more.

As shown in FIGS. 1 and 2, the housing 10 contains a plurality of magnetic heads 17 that record and reproduce information with respect to the respective magnetic disks 18, and an actuator assembly (which may as well be referred to as a head suspension assembly (HSA)) 22 that supports the magnetic heads 17 so as to be movable with respect to the corresponding magnetic disks 18. Further, in the housing 10, there are provided a voice coil motor (VCM) 24 that rotates and positions the actuator assembly 22, a ramp load mechanism 25 that holds the magnetic head 17 in an unloaded position away from the respective magnetic disk 18 when the magnetic head 17 is moved to the outermost circumferential periphery of the magnetic disk 18, a substrate board unit (FPC unit) 21 on which electronic components such as conversion connectors are mounted, and a spoiler 70. Note that the actuator assembly 22 and the VCM 24 constitute the head actuator.

To the outer surface of the bottom wall 12a of the base 12, a printed circuit board 27 is fixed by screws. The printed circuit board 27 constitutes a control unit that controls the operation of the spindle motor 19, as well as controls the VCM 24 and the magnetic heads 17 via the board unit 21.

FIG. 3 is a perspective showing the actuator assembly and the board unit. As shown in the figure, the actuator assembly 22 comprises an actuator block 29 having a through-hole 26, a bearing unit (unit bearing) 28 provided in the through-hole 26, a plurality of, for example, eleven arms 32 extending from the actuator block 29, a suspension assembly (which may as well be referred to as a head gimbal assembly: HGA) 30 attached to each arm 32, and a magnetic head 17 supported by each suspension assembly 30. A support shaft (pivot axis) 31 is provided stand on the bottom wall 12a of the base 12. The actuator block 29 is supported by the bearing unit 28 so as to be rotatable around the support shaft 31.

In this embodiment, the actuator block 29 and the eleven arms 32 are molded to be integrated as one body from aluminum or the like to form a so-called E-block. The arms 32 are each formed into, for example, a slender flat plate and extend from the actuator block 29 in a direction orthogonal to the support shaft 31. The eleven arms 32 are provided parallel to each other with a gap between each adjacent pair of the arms.

The actuator assembly 22 includes a support frame 33 extending from the actuator block 29 in a direction opposite to the respective arm 32, and the support frame 33 supports the voice coil 39, which forms a part of the VCM 24. The support frame 33 includes a first contact portion 33a that can be brought into contact with an inner stopper, which will be described later and a second contact portion 33b that can be brough into contact with an outer stopper, which will be described later. As shown in FIG. 2, the voice coil 39 is located between a pair of yokes 37a and 37b, one of which is fixed on the base 12, and together with these yokes 37a and 37b and a magnet fixed to either one of the yokes, the VCM 24 is constituted.

As shown in FIG. 3, the actuator assembly 22 comprises twenty suspension assemblies 30, each supporting a magnetic head 17. The suspension assemblies 30 are each attached to an extending end 32a of the respective arm 32. The plurality of suspension assemblies 30 each include an up-head suspension assembly that supports the respective magnetic head 17 upwardly and a down-head suspension assembly that supports the magnetic head 17 downwardly. The up-head suspension assembly and down-head suspension assembly are each constituted by arranging suspension assemblies 30 of the same structure in different vertical orientations.

According to this embodiment, as shown in FIG. 3, the down-head suspension assembly 30 is attached to the uppermost arm 32 and the up-head suspension assembly 30 is attached to the lowermost arm 32. Each of the in-between nine arms 32 comprises an up-head suspension assembly 30 and a down-head suspension assembly 30 attached thereto.

The suspension assemblies 30 each include an approximately rectangular-shaped base plate 38, a load beam 42 made of a slender leaf spring, and a slender belt-like flexure (wiring member) 40. The flexure 40 includes a displaceable gimbal portion, on which the respective magnetic head 17 is placed. The base plate 38 includes a proximal end portion that is fixed to the extending end 32a of the respective arm 32, for example, by being caulked. The load beam 42 includes a proximal end portion that overlaps and is fixed to the end portion of the base plate 38. The load beam 42 extends from the base plate 38 and tapers down toward the extending end. The base plate 38 and the load beam 42 are formed, for example, of stainless steel.

The load beam 42 generates a spring force (reaction force) that urges the magnetic head 17 toward the surface of the respective magnetic disk 18. Further, a tab 46 is provided to protrude from the distal end of the load beam 42. The tab 46 is formed to be engageable with the ramp 74, which will be described later, and together with the ramp 74, constitutes the ramp load mechanism 25.

As shown in FIG. 3, the FPC unit 21 includes an approximately rectangular-shaped base portion 21*a* bent into an L-shape, a slender belt-like relay portion 21*b* extending from one side edge of the base portion 21*a*, and a joint portion 21*c* continuously provided at a distal end of the relay portion 21*b*, which are integrated as one body. The base portion 21*a*, the relay portion 21*b*, and the joint portion 21*c* are formed from a flexible printed circuit board (FPC). The flexible printed circuit board includes an insulating layer of polyimide or the like, a conductive layer formed on the insulating layer, which forms a plurality of wiring lines, connection pads, and the like, and a protective layer covering the conductive layer.

On the base portion 21*a*, electronic components such as a conversion connector, a plurality of capacitors and the like, not shown in the figure, are mounted and electrically connected to the wiring lines not shown in the figure. To the base portion 21*a*, a metal plate that functions as a reinforcement plate is affixed. The base portion 21*a* is installed on the bottom wall 12*a* of the base 12. The relay portion 21*b* extends from the side edge of the base portion 21*a* toward the actuator block 29 of the actuator assembly 22. The joint portion 21*c* provided at the extending end of the relay section 21*b* is formed into a rectangular shape having a height and width approximately equal to those of the side surface (installation surface) of the actuator block 29, the joint portion 21*c* is affixed to the installation surface of the actuator block 29 via a backing plate made of aluminum or the like, and is further screwed and fixed to the installation surface with fixing screws 72. A number of connection pads are provided at the joint portion 21*c*. On the junction part 21*c*, for example, one head IC (head amplifier) 67 is mounted, and the head IC 67 is connected to the connection pads and the base portion 21*a* via wiring lines. Further, the joint portion 21*c* is provided with a connection terminal 68 to which the voice coil 39 is connected.

The flexure 40 of each of the suspension assemblies 30 includes one end portion electrically connected to the respective magnetic head 17, the other end portion extending through a groove formed in the side edge of the respective arm 32 to the actuator block 29, and a connection end portion (tail connection terminal) 48*c* provided at the other end portion. The connection end portion 48*c* is formed into a slender rectangular shape. In the connection end portion 48*c*, a plurality of, for example, thirteen connection terminals (connection pads) 51 are provided. These connection terminals 51 are connected to the wiring lines of the flexure 40, respectively. That is, the plurality of wiring lines of the flexure 40 extend over substantially the entire length of the flexure 40, and one end of each is electrically connected to the respective magnetic head 17, and the other end is connected to the respective connection terminal (connection pad) 51.

The connection terminal 51 provided at the connection end portion 48*c* is joined to the connection pad of the joint portion 21*c* and electrically connected to the respective wiring line of the joint portion 21*c* via the respective connection pad. With this configuration, the twenty magnetic heads 17 of the actuator assembly 22 are electrically connected to the base portion 21*a* via the wiring lines of the flexure 40, the connection end portions 48*c*, the joint portion 21*c* of the FPC unit 21, and the relay portion 21*b*, respectively.

As shown in FIGS. 1 and 2, with the actuator assembly 22 assembled into the base 12, the support shaft 31 is provided to stand approximately parallel to the spindle of the spindle motor 19, the actuator assembly 22 is supported so as to be pivotable around the support shaft 31 between the unloaded position (position indicated by solid line in FIG. 2) where the respective magnetic head 17 is unloaded to an outer side of the outermost circumference of the magnetic disk 18 and an inner circumferential position (position indicated by two dotted line in FIG. 2) where the magnetic head 17 is located on the innermost circumferential side of the magnetic disk 18. Each magnetic disk 18 is positioned between two suspension assemblies 30. When the HDD is in operation, the respective magnetic heads 17 supported by the two suspension assemblies 30 oppose the upper surface and lower surface of the magnetic disk 18, respectively.

The ramp load mechanism 25 comprises a ramp 74. As shown in FIG. 1, the ramp 74 is fixed to the base 12 and located near the peripheral portion of the magnetic disk 18. When the HDD is not in operation and the magnetic head 17 is moved out from the outer circumference of the magnetic disk 18 to a predetermined unload position, the tab 46 of the suspension assembly 30 runs on the ramp 74. In this manner, the magnetic head 17 is kept in the unloaded position spaced apart from the magnetic disk 18.

Figure 4:
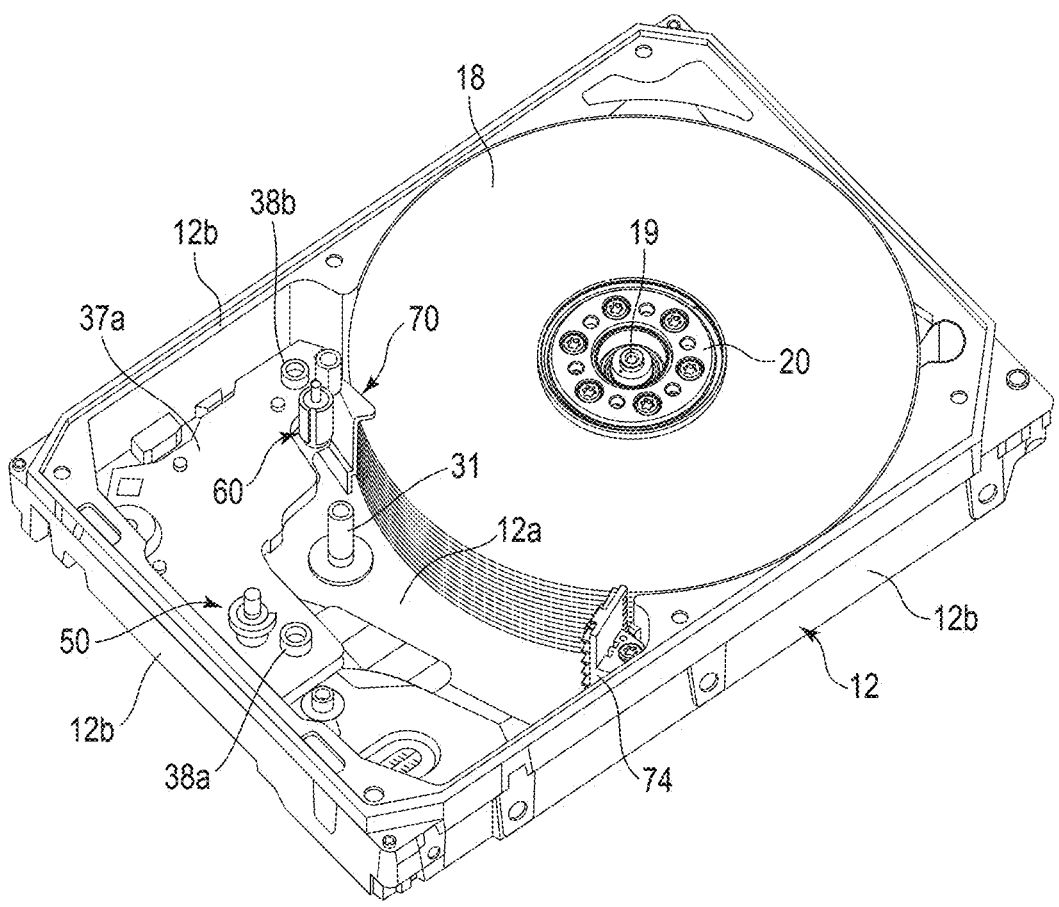
FIG. 4 is a perspective view showing the HDD when the head actuator assembly, the FPC unit, and upper yoke are removed.

FIG. 4 is a perspective view showing the HDD when the actuator assembly, the FPC unit, and an upper yoke 37*b* are removed. As shown in the figure, of a pair of yokes which constitute the VCM, a lower yoke 37*a* is located on the bottom wall 12*a* of the base 12 and is fixed to the bottom wall 12*a*. The lower yoke 37*a* is, for example, an approximately L-shaped flat plate and is disposed along a corner portion of the bottom wall 12*a*. At one end portion and the other end portion of the lower yoke 37*a*, support sleeves 38*a* and 38*b* are provided to stand thereon. As shown in FIGS. 1 and 2, the upper yoke 37*b* includes a flat plate having substantially a shape identical to that of the lower yoke 37*a* and a pair of leg portions extending from respective ends of the flat plate. The upper yoke 37*b* is disposed to overlap the lower yoke 37*a*. Further, the upper yoke 37*b* is fixed to the lower yoke 37*a* and the bottom wall 12*a* by two fixing screws 40*a* and 40*b* screwed into the bottom wall 12*a* through the cover 14, the upper yoke 37*b*, the support sleeves 38*a* and 38*b*, and the lower yoke 37*a*, respectively. The upper yoke 37*b* is provided to oppose the lower yoke 37*a* with a gap therebetween. In one example, permanent magnets M (see FIG. 5) are installed on the upper surface of the lower yoke 37*a* and the lower surface of the upper yoke 37*b*, respectively.

As shown in FIG. 4, the HDD 10 comprises an inner stopper (first stopper) 50 and an outer stopper (second stopper) 60 that define a range of movement (range of pivoting) of the actuator assembly 22. In one example, the inner stopper 50 is provided to stand on the lower yoke 37*a* in the vicinity of the support sleeve 38*a*. In one example, the outer stopper 60 is provided to stand on the bottom wall 12*a* in the vicinity of the support sleeve 38*b*.

As shown in FIG. 2, when the magnetic head 17 moves to the innermost circumferential side of the magnetic disk 18, the first contact portion 33a of the support frame 33 in the actuator assembly 22 is brought into contact with the inner stopper 50 so as to limit the range of movement of the magnetic head 17 to the inner circumferential side. Further, when the magnetic head 17 is unloaded from the magnetic disk 18 to evacuate to a parking area (unload position) on the ramp 74, the second contact portion 33b of the support frame 33 is brought into contact with the outer stopper 60, so as to limit the range of movement of the magnetic head 17 to the outer circumference side. With this configuration, the magnetic head 17 is prevented from falling off the ramp 74. Thus, the range of movement (range of pivoting) of the actuator assembly 22 is defined by the inner stopper 50 and the outer stopper 60.

Now, the inner stopper 50 and the outer stopper 60 will be described in detail.

Figure 5:
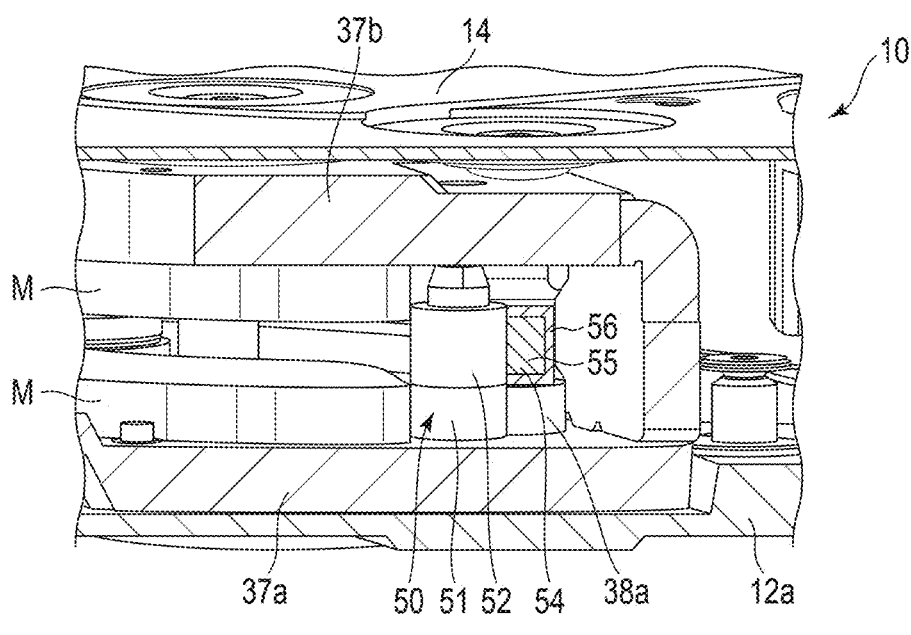
FIG. 5 is a cross-sectional view of the HDD, illustrating an inner stopper portion.
Figure 6:
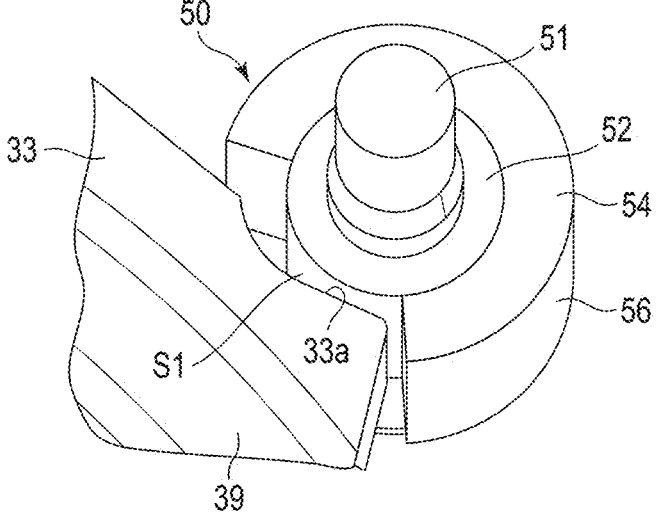
FIG. 6 is a perspective view showing the inner stopper.

FIG. 5 is a cross-sectional view of the HDD, illustrating the inner stopper portion, FIG. 6 is a perspective view of the inner stopper, and FIG. 7 is a partially exploded perspective view of the adsorption unit of the inner stopper.

As shown in FIGS. 5 and 6, the inner stopper 50 includes a stopper pin 51 provided to stand between the lower yoke 37a and the upper yoke 3b, a cushioning member 52 attached to the stopper pin 51, and an adsorption unit 54 provided around the cushioning member 52.

The stopper pin 51 includes one end portion engaged with a through-hole of the lower yoke 37a and the other end engaged with a through-hole of the upper yoke 37b, and is provided to stand approximately perpendicular to the lower yoke 37a. The cushioning member 52, in one example, is formed into a cylindrical shape. The cushioning member 52 is attached to the stopper pin 51 with its inner circumference being closely contact with the circumferential surface of the stopper pin 51. A part of the outer circumferential surface of the cushioning member 52 constitutes a first contact surface S1 with which the first contact portion 33a of the actuator assembly 22 is brought into contact. The cushioning member 52 is formed of a cushioning material having elasticity, such as rubber, elastomer or the like.

As shown in FIGS. 6 and 7, the adsorption unit 54 includes a gas adsorption member (which will be referred to as an adsorption member, hereinafter) 55 that adsorbs outgassed materials and an outer case 56 that covers most of the adsorption member 55. The adsorption member 55 can be made from, for example, a carbon-based adsorbent such as activated carbon, a synthetic adsorbent, silica gel, or the like. In one example, the adsorption member 55 is made of granular or powdered activated carbon molded into a desired shape. In this embodiment, the adsorption member 55 is molded into an arc or C-ring shape having a desired thickness and width. The adsorption member 55 has an arc-shaped inner circumferential surface as an adsorption surface 55a, an arc-shaped outer circumferential surface, arc-shaped upper surface and lower surface, and a pair of end surfaces joined to the upper and lower surfaces, respectively. The adsorption surface 55a has a diameter and width (axial width) corresponding to those of the outer circumferential surface of the cushioning member 52.

The outer case 56 is formed of, for example, a metal sheet such as aluminum alloy, stainless steel or the like, or a resin such as polycarbonate, and has an arc or C-ring shape. The inner circumferential side of the outer case 56, that is, the stopper side, is open, that is, apertured. The adsorption member 55 is stored or sealed in the outer case 56. The outer surfaces of the adsorption member 55 except for the adsorption surface 55a (that is, the outer circumferential surface, upper surface, bottom surface, and end surfaces) are covered by the outer case 56. In other words, only the adsorption surface 55a portion is exposed to the outside of the outer case 56.

As shown in FIGS. 5 and 6, the adsorption unit 54 is coaxially attached to the cushioning member 52 with the inner circumferential edge portion of the outer case 56 being fitted to the outer circumferential surface of the cushioning member 52. The adsorption unit 54 covers the outer circumferential surface of the cushioning member 52 except for the portion of the first contact surface S1. The adsorption surface 55a of the adsorption member 55 is in contact with the outer circumferential surface of the cushioning member 52 except for the portion of the first contact surface S1. As mentioned above, the outer surfaces of the adsorption member 55 except for the adsorption surface 55a are covered by the outer case 56. Note that the adsorption surface 55a is not limited to a configuration to be brought into contact with the outer circumferential surface of the cushioning member 52, but may be configured to be adjacent and oppose to the outer circumferential surface with a slight gap therebetween.

With the inner stopper 50 configured as described above, outgassed material can be directly adsorbed by the adsorption member 55 from the surface of the cushioning member 52, which is the source of outgassing. With this configuration, it is possible to significantly reduce the amount of diffusion of outgassed material itself diffusing in the housing. Further, according to this embodiment, such an advantageous effect can be obtained that the diffusion of contaminants generated from the adsorption member 55 is suppressed by the configuration of covering the outer surface of the adsorption member 55 with the outer case 56.

Note that the shapes of the adsorption member 55 and the outer case 56 are not limited to circular arc shapes, but various shapes can be adopted. The adsorption member 55 need only include an adsorption surface 55a that covers the outer surface of the cushioning member 52, and the shape of the other portions of the adsorption member 55 can be selected arbitrarily. Similarly, the outer case 56 need only be shaped to cover the outer surface of the adsorption member 55 excluding the adsorption surface 55a. Further, the adsorption unit 54 is not limited to a configuration that is attached to the cushioning member 52, but may as well be configured to be attached to the lower yoke 37a or the upper yoke 37b via a support member.

Figure 9:
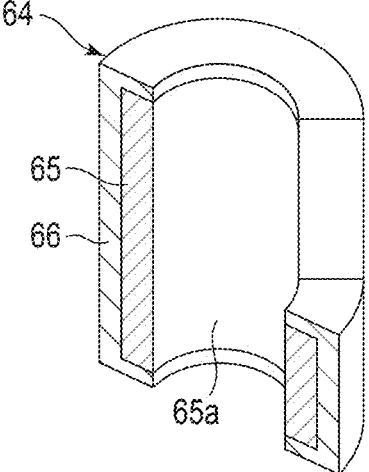
FIG. 9 is a partially exploded perspective view showing a adsorption unit of the outer stopper.
Figure 10:
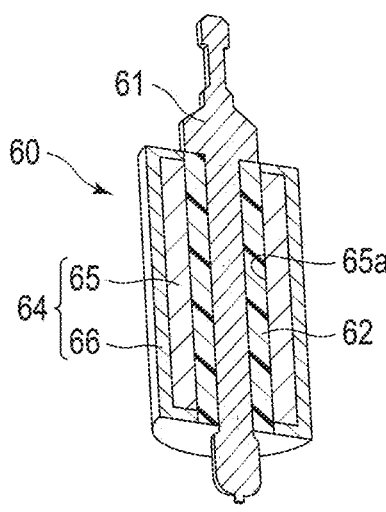
FIG. 10 is a cross-sectional view of the outer stopper.

FIG. 8 is a perspective view of the outer stopper, FIG. 9 is a partially exploded perspective view of the adsorption unit of the outer stopper, and FIG. 10 is a longitudinal cross-sectional view of the outer stopper.

As shown in FIGS. 8 and 10, the outer stopper 60 includes a stopper pin 61, a cushioning member 62 attached to the stopper pin 61, and an adsorption unit 64 provided to surround the cushioning member 62.

The stopper pin 61 includes one end engaged with a through-hole of the bottom wall 12a and the other end engaged with the cover 14, and is formed to stand approximately perpendicular to the bottom wall 12a. In one example, the cushioning member 62 is formed into a cylindrical shape. The cushioning member 62 is attached to the stopper pin 61 with its inner circumferential surface being tightly in contact with the circumferential surface of the stopper pin 61. A part of the outer circumferential surface of the cushioning member 62 constitutes a second contact surface S2 with which the second contact portion 33b of the actuator assembly 22 is brought into contact. The cushioning member 62 is formed of a cushioning material having elasticity, such as rubber, elastomer or the like.

As shown in FIGS. 8, 9, and 10, the adsorption unit 64 includes an adsorption member 65 that adsorbs outgassed materials and an outer case 66 that covers most of the adsorption member 65. The adsorption member 65 can be made from, for example, a carbon-based adsorbent such as activated carbon, synthetic adsorbent, silica gel, or the like. In one example, the adsorption member 65 is made of granular or powdered activated carbon molded into a desired shape. In this embodiment, the adsorbent 65 as a whole is formed into a cylindrical shape having a desired thickness and width (axial length), and further, approximately an axial upper half portion thereof is formed into an arc or C-ring shape with an open portion corresponding to the second contact surface S2 of the buffer material 62 mentioned above. The adsorption member 65 includes an annular lower inner circumferential surface and an arc-shaped upper inner circumferential surface, a circular lower outer circumferential surface and an arc-shaped upper outer circumferential surface, an arc-shaped upper surface, an arc-shaped upper surface, an annular lower surface, and a pair of end surfaces joined to the upper surface and lower surface, which constitute the adsorption surface 65a. The adsorption surface 65a has a diameter and width (axial width) corresponding to the outer circumferential surface of the cushioning member 62.

The outer case 66 is formed from, for example, a metal plate and has a shape similar to the outer surface of the adsorption member 65. That is, the lower part of the outer case 66 has a cylindrical shape and the upper part has an arc or C-ring shape. The inner circumferential side of the outer case 56 is open, that is, apertured. The adsorption member 65 is stored or sealed in the outer case 66. The outer surfaces of the adsorption member 65 excluding the adsorption surface 65a (that is, the outer circumferential surface, upper surface, lower surface, and end surfaces) are covered by the outer case 66. In other words, only the adsorption surface 65a portion is exposed to the outside of the outer case 66.

As shown in FIGS. 8 and 10, the adsorption unit 64 is coaxially attached to the cushioning member 62 with the inner circumferential edge of the outer case 66 being fitted to the outer circumferential surface of the cushioning member 62. The adsorption unit 64 covers the outer circumferential surface of the cushioning member 62 except for the portion of the second contact surface S2. The adsorption surface 65a of the adsorption member 65 is in contact with the outer circumferential surface of the cushioning member 62, except for the portion of the second contact surface S2. As mentioned above, the outer surfaces of the adsorption member 65 except for the adsorption surface 65a are covered by the outer case 66. Note that the adsorption surface 65a is not limited to a configuration to be brought into contact with the outer circumferential surface of the cushioning member 62, but may as well be configured to be adjacent and oppose to the outer circumferential surface with a slight gap therebetweeen.

With the outer stopper 60 configured as described above, outgases materials generated from the surface of the cushioning member 62 can be directly adsorbed by the adsorption member 65. With this configuration, it is possible to significantly reduce the amount of the outgassed materials diffused in the housing.

Note that the shapes of the adsorption member 65 and outer case 66 are not limited to cylindrical shapes or arc shapes, but various shapes can be adopted. The adsorption member 65 need only include an adsorption surface 65a that covers the outer surface of the cushioning member 62, and the shape of the other portion of the adsorption member 65 can be selected arbitrarily. Similarly, the outer case 66 need only be shaped to cover the outer surface of the adsorption member 65 except for the adsorption surface 65a. Note that the adsorption unit 64 is not limited to such a configuration as to be attached to the cushioning member 62, but may as well be configured to be attached to the bottom wall 12a via a support member.

According to the HDD of the first embodiment configured as described above, the adsorption members 55 and 65 are installed to be in contact with or close to the cushioning members 52 and 62 of the stopper, which are sources of outgassing. With this configuration, the outgassed materials generated from the cushioning members can be directly and efficiently adsorbed by the adsorption members 55 and 65, thereby making it possible to significantly reduce the amount of outgassed materials diffused in the housing. In this manner, it is possible to provide a magnetic disk device which can suppress failures caused by outgassing and thus improve the reliability.

Note that the first embodiment is configured such that the adsorption member is provided in both the inner stopper 50 and the outer stopper 60, but it is not limited to this configuration. For example, the adsorption member may be provided in only one of the inner stopper 50 and the outer stopper 60. Even in this case, the advantageous effect of reducing the amount of diffusion of outgassed materials can be obtained.

Next, HDDs according to other embodiments will be described. In the other embodiments described below, parts identical to those the first embodiment described above will be denoted by the same reference symbols, and the detailed descriptions thereof will be omitted or simplifies. The detailed descriptions will focus on parts that differ from those of the first embodiment.

Second Embodiment

FIG. 11 shows a perspective view showing an inner stopper of an HDD according to the second embodiment, and FIG. 12 is a partially exploded perspective view of a cushioning member and adsorption unit of the inner stopper.

As shown in FIGS. 11 and 12, in the second embodiment, the adsorption member 55 of the inner stopper 50 is configured to cover an upper end surface 52a of the cushioning member 52 in addition to the outer circumferential surface of the cushioning member 52. In other words, the adsorption member 55 includes an adsorption surface 55a brought into contact with or located adjacent to oppose the outer circumferential surface of the cushioning member 52 and an adsorption surface 55b brought into contact with or adjacent to oppose the upper end surface 52a of the cushioning member 52, except for the first contact surface S1. The outer case 56 covers the outer surfaces of the adsorption member 55 except for the adsorbent surfaces 55a and 55b (that is, the outer circumferential surface, upper surface, lower surface, and end surfaces).

Figures 13A, 13B:
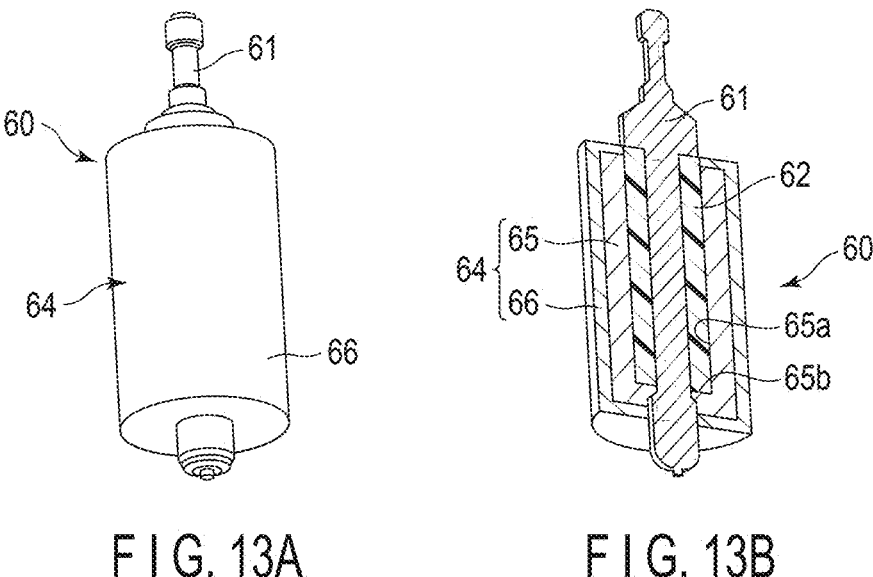
FIG. 13A is a perspective view showing an outer stopper of the second embodiment.
FIG. 13B is a cross-sectional view showing the outer stopper of the second embodiment.

FIG. 13A is a perspective view showing an outer stopper in the second embodiment, and FIG. 13B is a longitudinal cross-sectional view of the outer stopper in the second embodiment.

As shown in the figures, in the second embodiment, the adsorption member 65 of the outer stopper 60 is configured to cover the lower end surface of the cushioning member 62 in addition to the outer circumferential surface of the cushioning member 62. In other words, the adsorption member 65 comprises an adsorption surface 65a brought into contact with or located adjacent to oppose the outer circumferential surface of the cushioning member 52 and an adsorption surface 65b brought into contact with or located adjacent to oppose the lower end surface of the cushioning member 62, except for the second contact surface. The outer case 66 covers the outer surfaces of the adsorption member 65 except for the adsorbent surfaces 65a and 65b (that is, the outer circumferential surface, upper surface, lower surface, and end surfaces).

In the second embodiment, the configuration of other parts of the HDD is similar to that of the HDD of the first embodiment described above. According to the second embodiment, the adsorption members 55 and 65 can adsorb even more outgassed materials, and the amount of outgassed material diffused in the housing can be further reduced.

Third Embodiment

Figure 14:
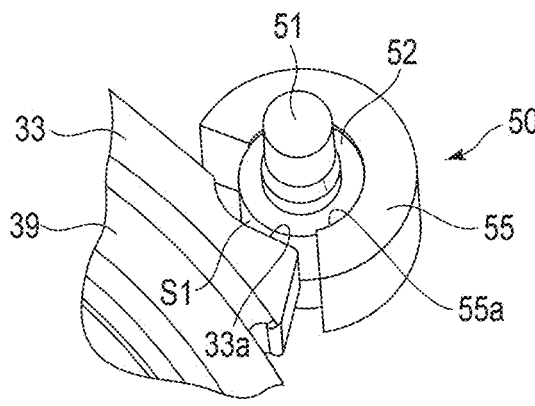
FIG. 14 is a perspective view showing an inner stopper of an HDD according to the third embodiment.

FIG. 14 is a perspective view showing an inner stopper 50 of an HDD according to the third embodiment.

As shown in the figure, according to the third embodiment, the adsorption unit is constituted by only an adsorption member 55, omitting the outer case. In one example, the adsorption member 55 is formed into an arc-shaped or C-ring shape having a desired thickness and width, and has an arc-shaped inner circumferential surface as the adsorption surface 55a, an arc-shaped outer circumferential surface, arc-shaped upper and lower surfaces, and a pair of end surfaces joined to the upper and lower surfaces, respectively. The adsorption surface 55a has a diameter and width (axial width) corresponding to the outer circumferential surface of the cushioning member 52.

The adsorption member 55 is attached to the cushioning member 52 and covers the outer circumferential surface of the cushioning member 52 except for the first contact surface S1. The adsorption surface 55a is in contact with the outer circumferential surface of the cushioning member 52.

In the third embodiment of the above-described configuration as well, outgassed materials generated from the cushioning member 52 can be directly and efficiently adsorbed by the adsorption member 55, and the amount of outgassed materials diffused in the housing can be significantly reduced. Further, according to the third embodiment, the outer case is omitted, and thus the number of parts can be reduced.

Fourth Embodiment

Figure 15:
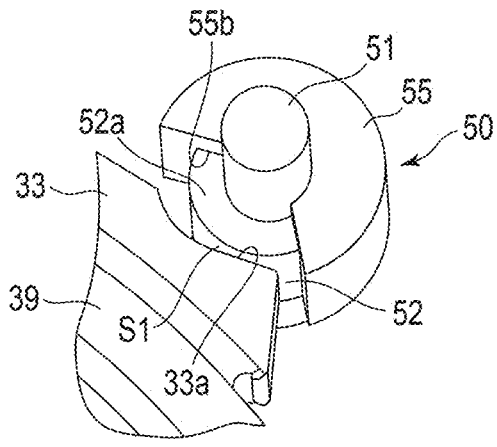
FIG. 15 is a perspective view showing an inner stopper of an HDD according to the fourth embodiment.

FIG. 15 is a perspective view showing an inner stopper 50 of an HDD according to the fourth embodiment.

As shown in the figure, according to the fourth embodiment, the adsorption unit is constituted only by the adsorption member 55, omitting the outer case. The adsorption member 55 is configured to cover an upper end surface 52a of the cushioning member 52 in addition to the outer circumferential surface of the cushioning member 52. In other words, the adsorption member 55 comprises an adsorption surface 55a brought into contact with the outer circumferential surface of the cushioning member 52 and an adsorption surface 55b brought into contact with the upper end surface 52a of the cushioning member 52, except for the first contact surface S1.

With the inner stopper 50 of the fourth embodiment, the adsorption member 55 can adsorb even more outgassed materials, and the amount of outgassed materials diffused in the housing can be further reduced. According to the fourth embodiment, the outer case is omitted, and thus the number of parts can be reduced.

Fifth Embodiment

Figure 16A:
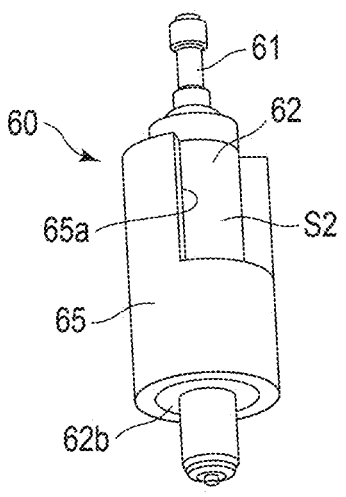
FIG. 16A is a perspective view showing an outer stopper according to the fifth embodiment.

FIG. 16A is a perspective view showing an outer stopper 60 of an HDD according to the fifth embodiment. As shown in the figure, according to the fifth embodiment, the adsorption unit is constituted only by an adsorption member 65, omitting the outer case. In one example, the adsorption member 65 is configured in a manner similar to that of the adsorption member of the outer stopper in the first embodiment. That is, the adsorption member 65 as a whole is formed into a cylindrical shape having a desired thickness and width (axial length), and further, an axial upper half portion thereof is formed into an arc or C-ring shape with an opening portion corresponding to the second contact surface S2 of the cushioning member 62. The adsorption member 65 has an annular lower inner circumferential surface and an arc-shaped upper inner circumferential surface, an annular lower outer circumferential surface and an arc-shaped upper outer circumferential surface, an arc-shaped upper surface, an annular lower surface, and a pair of end surfaces joined to the upper and lower surfaces, respectively, which constitute the adsorption surface 65a. The adsorption surface 65a has a diameter and width (axial width) corresponding to the outer circumferential surface of the cushioning member 62.

The adsorption member 65 is attached to the cushioning member 62 and covers the outer circumferential surface of the cushioning member 62 except for the second contact surface S2. The adsorption surface 65a is in contact with the outer circumferential surface of the cushioning member 62.

In the fifth embodiment of the above-described configuration as well, outgassed materials generated from the cushioning member 62 can be directly and efficiently adsorbed by the adsorption member 65, and the amount of outgases materials diffused in the housing can be significantly reduced. Further, according to the fifth embodiment, the outer case is omitted, and therefore the number of parts can be reduced.

Sixth Embodiment

Figure 16B:
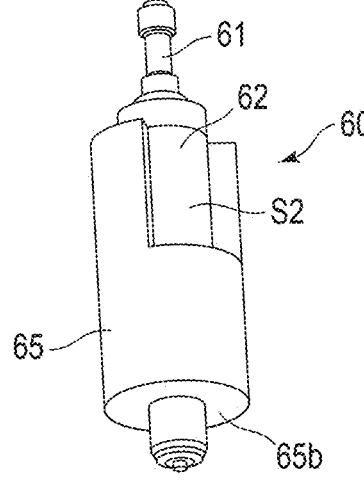
FIG. 16B is a perspective view showing an outer stopper according to the sixth embodiment.

FIG. 16B is a perspective view showing an outer stopper 60 of an HDD according to the sixth embodiment. As shown in the figure, according to the sixth embodiment, the adsorption unit is constituted only by an adsorption member 65, omitting the outer case. In this embodiment, the adsorption member 65 is configured to cover the lower end surface 62b of the cushioning member 62 in addition to the outer circumferential surface of the cushioning member 62. In other words, the adsorption member 65 comprises an adsorption surface in contact with the outer circumferential surface of the cushioning member 62 and an adsorption surface in contact with the bottom end surface of the cushioning member 62, except for the second contact surface S2.

According to the outer stopper 60 of the sixth embodiment, the adsorption member 65 can adsorb even more outgassed materials and can further reduce the amount of outgassed materials diffused in the housing. In the sixth embodiment, the outer case is omitted, and therefore the number of parts can be reduced.

Seventh Embodiment

FIG. 17 is a cross-sectional view of an HDD according to the seventh embodiment, illustrating an inner stopper portion thereof, and FIG. 18 is a perspective view of the inner stopper of the seventh embodiment.

As shown in FIG. 17, the HDD includes a support sleeve 38*a* provided to stand at one end portion of the lower yoke 37*a*. The support sleeve 38*a* includes a lower end brought into contact with the upper surface of the lower yoke 37*a* and an upper end brought into contact with the inner surface of the upper yoke 37*b*. The support sleeve 38*a* is held between the lower yoke 37*a* and the upper yoke 37*b* so as to stand approximately perpendicular to the lower yoke 37*a*. The bottom wall 12*a* comprises a boss 13*a* with a threaded hole. The boss 13*a* extends through the lower yoke 37*a* and into the lower end portion of the support sleeve 38*a*. The upper yoke 37*b* is fixed to the lower yoke 37*a* and the bottom wall 12*a* by a fixing screw 40*a* screwed into the boss 13*a* of the bottom wall 12*a* through the cover 14, upper yoke 37*b*, and support sleeve 38*a*.

According to this embodiment, the inner stopper 50 includes a cushioning member 52 attached to the outer circumference of the support sleeve 38*a* and a adsorption unit 54 provided to surround the cushioning member 52. In one example, the cushioning member 52 is formed into a cylindrical shape and attached to the support sleeve 38*a* with its inner circumferential surface tightly in contact with the circumferential surface of the support sleeve 38*a*.

As shown in FIGS. 17 and 18, a part of the outer circumferential surface of the cushioning member 52 constitutes a first contact surface S1 with which the first contact portion 33*a* is brought into contact. The cushioning member 52 is formed of a cushioning material having elasticity, such as rubber, elastomer or the like.

The adsorption unit 54 includes an adsorption member 55 that adsorbs outgassed materials and an outer case 56 that covers most of the adsorption member 55. In one example, the adsorption member 55 is made of granular or powdered activated carbon formed into a desired shape. In this embodiment, the adsorption member 55 is molded into an arc or C-ring shape having a desired thickness and width. The adsorption member 55 comprises an arc-shaped inner circumferential surface, an arc-shaped outer circumferential surface, arc-shaped upper surface and lower surface, and a pair of end surfaces joined to the upper and lower surfaces, respectively, as the adsorption surface 55*a*. The adsorption surface 55*a* has a diameter and width (axial width) corresponding to the outer circumferential surface of the cushioning member 52.

The outer case 56 is formed of a metal plate or resin and has an arc or C-ring shape. The inner circumferential side of the outer case 56, that is, the stopper side, is open, that is, apertured. The adsorption member 55 is stored or sealed in the outer case 56. The outer surfaces of the adsorption member 55 except for the adsorption surface 55*a* (that is, the outer circumferential surface, upper surface, lower surface, and end surfaces) are covered by the outer case 56. In other words, only the portion of the adsorption surface 55*a* is exposed to the outside of the outer case 56.

The adsorption unit 54 is coaxially attached to the cushioning member 52 with the inner circumferential edge of the outer case 56 being fitted to the outer circumferential surface of the cushioning member 52. The adsorption unit 54 covers the outer circumferential surface of the cushioning member 52 except for the portion of the first contact surface S1. The adsorption surface 55*a* of the adsorption member 55 is in contact with the outer circumferential surface of the cushioning member 52 except for the portion of the first contact surface S1. As mentioned above, the outer surfaces of the adsorption member 55 except for the adsorption surface 55*a* are covered by the outer case 56. Note that the adsorption surface 55*a* is not limited to such a configuration that is in contact with the outer circumferential surface of the cushioning member 52, but may as well be configured to be adjacent to oppose to the outer circumferential surface with a slight gap therebetween.

With the inner stopper 50 configured as described above, outgassed materials generated from the surface of the cushioning member 52 can be directly adsorbed by the adsorption member 55. With this configuration, it is possible to significantly reduce the amount of outgassed materials diffused in the housing. Further, according to this embodiment, the outer surface of the adsorption member 55 is configured to be covered by the outer case 56, such an advantage can be obtained that the diffusion of contaminants generated from the adsorption member 55 is suppressed.

FIG. 19 is a cross-sectional view of an HDD according to the seventh embodiment, illustrating an outer stopper portion of the HDD, and FIG. 20 is a perspective view showing the outer stopper of the seventh embodiment.

As shown in FIG. 19, the HDD includes a support sleeve 38*b* provided to stand at the other end of the lower yoke 37*a*. The support sleeve 38*b* is held between the lower yoke 37*a* and the upper yoke 37*b* so as to stand approximately perpendicular to the lower yoke 37*a*. The upper yoke 37*b* is fixed to the lower yoke 37*a* and the bottom wall 12*a* by a fixing screw 40*b* screwed into a boss 13*b* of the bottom wall 12*a* through the cover 14, the upper yoke 37*b*, and the support sleeve 38*b*.

According to the seventh embodiment, the outer stopper 60 includes a cushioning member 62 attached to the outer circumference of the support sleeve 38*b* and an adsorption unit 64 provided to surround the cushioning member 62. In one example, the cushioning member 62 is formed into a cylindrical shape and attached to the support sleeve 38*b* with its inner circumferential surface being in tight contact with the circumferential surface of the support sleeve 38*b*.

As shown in FIGS. 19 and 20, a part of the outer circumference of the cushioning member 62 constitutes a second contact surface S2 with which the second contact portion 33*b* of the actuator assembly 22 is brought into contact. The cushioning member 62 is formed of a cushioning material having elasticity, such as rubber, elastomer or the like.

The adsorption unit 64 includes an adsorption member 65 that adsorbs outgassed materials and an outer case 66 that covers most of the adsorption member 65. In one example, the adsorption unit 64 has a configuration identical to that of the adsorption unit 54 of inner stopper 50. Therefore, a detailed description of the adsorption unit 64 will be omitted here. The adsorption unit 64 is coaxially attached to the cushioning member 62 with the inner circumferential edge of the outer case 66 being fitted to the outer circumferential surface of the cushioning member 62. The adsorption unit 64 covers the outer circumferential surface of the cushioning member 62 except for the portion of the second contact surface S2. The adsorption surface 65*a* of the adsorption member 65 is in contact with the outer circumferential surface of the cushioning member 62 except for the portion of the second contact surface S2. The outer surfaces of the adsorption member 65 except for the adsorption surface 65*a* are covered by the outer case 66. Note that the adsorption surface 65*a* is not limited to such a configuration as to be brought into contact with the outer circumferential surface of the cushioning member 62, but may as well be configured to be adjacent to oppose to the outer circumferential surface with a slight gap therebetween.

With the outer stopper 60 configured as described above, outgassed materials generated from the surface of the cushioning member 62 can be directly adsorbed by the adsorption member 65. With this configuration, it is possible to significantly reduce the amount of outgassed materials diffused in the housing. Further, according to this embodiment, the outer surface of the adsorption member 65 is configured to be covered by the outer case 66, such an advantageous effect can be obtained that the diffusion of contaminants generated from the adsorption member 65 is suppressed.

As described above, according to the seventh embodiment having such a configuration that the inner stopper 50 and outer stopper 60 are provided in the support sleeves 38a and 38b, respectively, advantageous operational effects similar to those of the first embodiment described above can be obtained. In other words, in the seventh embodiment as well, outgassed materials generated from the cushioning members 52 and 62 can be directly and efficiently adsorbed by the adsorption members 55 and 65, thereby making it possible to significantly reduce the amount of outgassed materials diffused in the housing.

Eighth Embodiment

Figure 21:
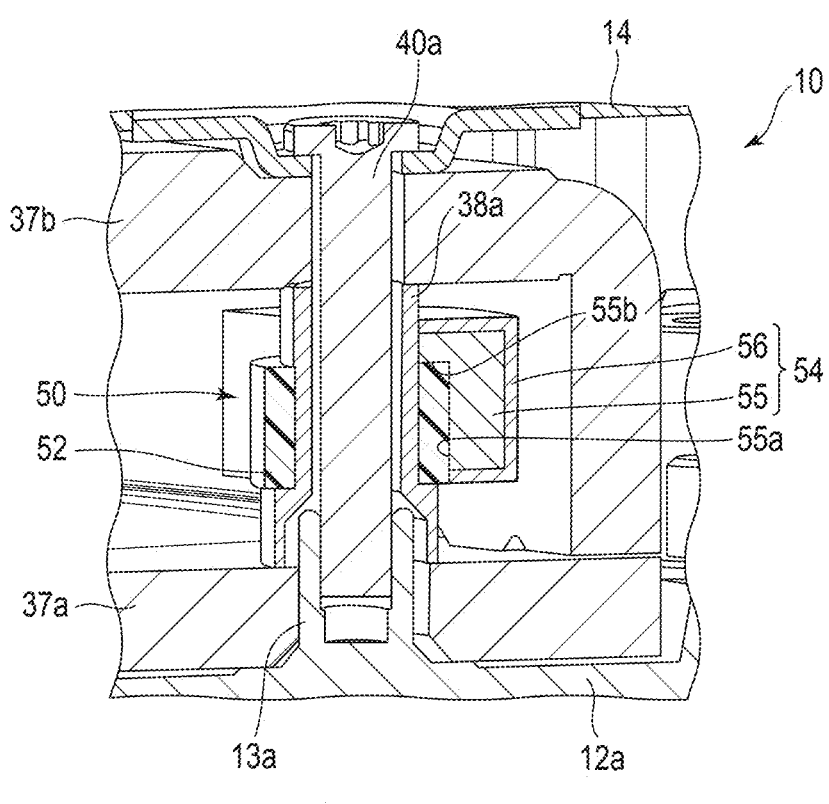
FIG. 21 is a cross-sectional view of an HDD according to the eighth embodiment, illustrating an inner stopper portion of the HDD.
Figure 22:
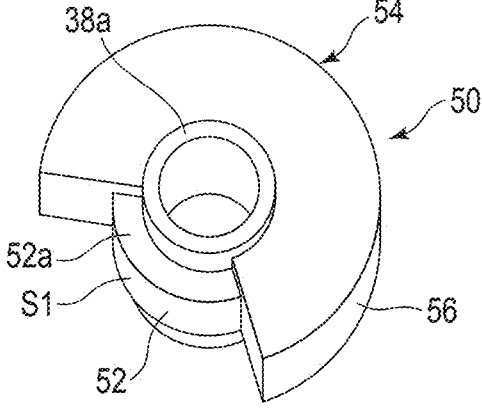
FIG. 22 is a perspective view showing the inner stopper of the eighth embodiment.

FIG. 21 is a cross-sectional view of an HDD according to the eighth embodiment, illustrating an inner stopper portion of the HDD, and FIG. 22 is a perspective view of the inner stopper according to the eighth embodiment.

As shown in FIG. 21, according to this embodiment, the inner stopper 50 includes a cushioning member 52 attached to the outer circumference of the support sleeve 38a and an adsorption unit 54 provided to surround the cushioning member 52. In one example, the cushioning member 52 is formed into a cylindrical shape and attached to the support sleeve 38a with its inner circumferential surface being tightly in contact with the circumferential surface of the support sleeve 38a.

As shown in FIGS. 21 and 22, a part of the outer circumference of the cushioning member 52 constitutes a first contact surface S1 with which the first contact portion 33a is brought into contact. The cushioning member 52 is formed of a cushioning material having elasticity, such as rubber, elastomer, or the like.

The adsorption unit 54 includes an adsorption member 55 that adsorbs outgassed materials and an outer case 56 that covers most of the adsorption member 55. In one example, the adsorption unit 54 is configured in a manner substantially similar to that of the adsorption unit 54 in the aforementioned seventh embodiment. Here, parts different from those will be described in detail. According to the eighth embodiment, the adsorption member 55 of the adsorption unit 54 is configured to cover the upper end surface 52a of the cushioning member 52 in addition to the outer circumferential surface of the cushioning member 52. In other words, the adsorption member 55 comprises an adsorption surface 55a brought into contact with or located adjacent to oppose the outer circumferential surface of the cushioning member 52 and an adsorption surface 55b brought into contact with or located adjacent to oppose the upper end surface 52a of the cushioning member 52, except for the first contact surface S1. The outer case 56 covers the outer surfaces of the adsorption member 55 except for the adsorbent surfaces 55a and 55b (that is, outer circumferential surface, upper surface, lower surface, and end surfaces).

FIG. 23 is a cross-sectional view of the HDD of the eighth embodiment, illustrating an outer stopper portion of the HDD, and FIG. 24 is a perspective view showing the outer stopper of the eighth embodiment.

As shown in FIG. 23, according to the eighth embodiment, the outer stopper 60 includes a cushioning member 62 attached to the outer circumferential surface of the support sleeve 38b and an adsorption unit 64 provided around the cushioning member 62. In one example, the cushioning member 62 is formed in a cylindrical shape and attached to the support sleeve 38b with its inner circumferential surface tightly in contact with the circumferential surface of the support sleeve 38b.

As shown in FIGS. 23 and 24, a part of the outer circumferential surface of the cushioning member 62 constitutes a second contact surface S2 with which the second contact portion 33b of the actuator assembly 22 is brought into contact. The cushioning member 62 is formed of a cushioning material having elasticity, such as rubber, elastomer or the like.

The adsorption unit 64 includes an adsorption member 65 that adsorbs outgassed materials and an outer case 66 that covers most of the adsorption member 65. In one example, the adsorption unit 64 has a configuration identical to that of the adsorption unit 54 of the inner stopper 50. That is, the adsorption member 65 of the adsorption unit 64 is configured to cover the upper end surface 62a of the cushioning member 62 in addition to the outer circumferential surface of the cushioning member 62. The adsorption member 65 comprises an adsorption surface 65a brought into contact with or located adjacent to oppose the outer circumferential surface of the cushioning member 62 and an adsorption surface 65b brought into contact with or located adjacent to oppose the upper end surface 62a of the cushioning member 62, except for the second contact surface S2. The outer case 66 covers the outer surfaces of the adsorption member 65 except for the adsorbent surfaces 65a and 65b (that is, outer circumferential surface, upper surface, lower surface, and end surfaces).

As described above, according to the eighth embodiment as well configured such that the inner stopper 50 and the outer stopper 60 are provided on the support sleeves 38a and 38b, advantageous operation effects similar to those of the first embodiment described above can be obtained. In other words, in the eighth embodiment as well, outgassed materials generated from the cushioning member s 52 and 62 can be directly and efficiently adsorbed by the adsorption members 55 and 65, and the amount of outgassed materials diffused in the housing can be significantly reduced. Further, the eighth embodiment is configured such that the adsorption member 55 and 56 cover the circumferential surfaces and end surfaces of the cushioning members 52 and 62, and therefore the adsorption members 55 and 65 can adsorb even more outgassed materials, and the amount of outgassed materials diffused in the housing can be further reduced.

Ninth Embodiment

Figure 25:
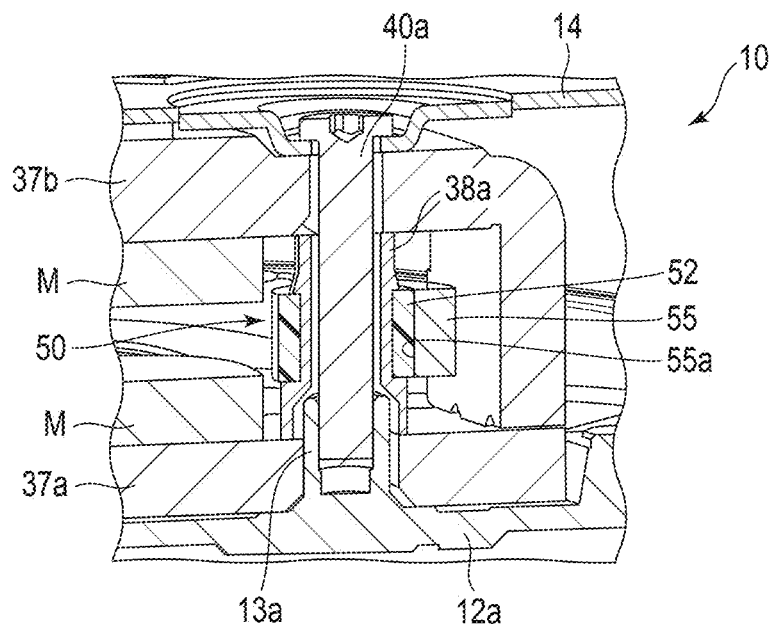
FIG. 25 is a cross-sectional view of an HDD according to the ninth embodiment, illustrating an inner stopper portion of the HDD.
Figure 26:
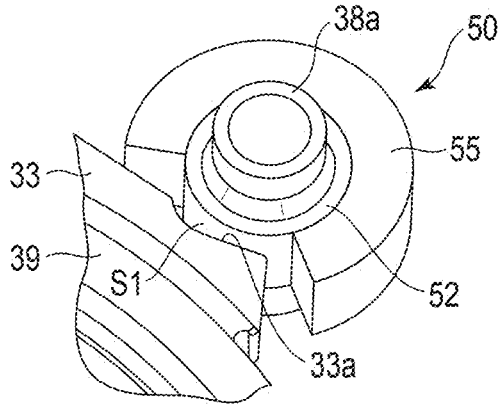
FIG. 26 is a perspective view showing the inner stopper of the ninth embodiment.

FIG. 25 is a cross-sectional view of an HDD according to the ninth embodiment, illustrating an inner stopper portion of the HDD, and FIG. 26 is a perspective view of the inner stopper of the ninth embodiment.

As shown in FIG. 25, according to this embodiment, the inner stopper 50 includes a cushioning member 52 attached to the outer circumferential surface of the support sleeve 38a and an adsorption member 55 provided to surround the cushioning member 52. In one example, the cushioning member 52 is formed into a cylindrical shape and attached to the support sleeve 38a with its inner circumferential surface being tightly in contact with the circumferential surface of the support sleeve 38a.

As shown in FIGS. 25 and 26, a part of the outer circumferential surface of the cushioning member 52 constitutes a first contact surface S1 with which the first contact portion 33a of the actuator assembly 22 is brought into contact. The cushioning member 52 is formed of a cushioning material having elasticity, such as rubber or elastomer, for example.

According to the ninth embodiment, the adsorption unit is constituted only by the adsorption member 55, omitting the outer case. In one example, the adsorption member 55 is formed into an arc-shaped or C-ring shape having a desired thickness and width, and has an arc-shaped inner circumferential surface, an arc-shaped outer circumferential surface, arc-shaped upper and lower surfaces, and a pair of end surfaces joined to the upper and lower surfaces, respectively, as an adsorption surface 55a. The adsorption surface 55a has a diameter and width (axial width) corresponding to the outer circumferential surface of the cushioning member 52.

The adsorption member 55 is attached to the cushioning member 52 and covers the outer circumferential surface of the cushioning member 52 except for the first contact surface S1. The adsorption surface 55a is in contact with the outer circumferential surface of the cushioning member 52.

FIG. 28 is a cross-sectional view of the HDD according to the ninth embodiment, illustrating an outer stopper portion of the HDD, and FIG. 26 is a perspective view of the outer stopper according to the ninth embodiment.

As shown in FIG. 28, according to this embodiment, the outer stopper 60 includes a cushioning member 62 attached to the outer circumferential surface of the support sleeve 38b and an adsorption member 65 provided to surround the cushioning member 62. In one example, the cushioning member 62 is formed into a cylindrical shape and attached to the support sleeve 38b with its inner circumferential surface tightly in contact with the circumferential surface of the support sleeve 38b.

As shown in FIGS. 28 and 29, a part of the outer circumferential surface of the cushioning member 62 constitutes a second contact surface S2 with which the second contact portion 33b is brought into contact. The cushioning member 62 is formed of a cushioning material having elasticity, such as rubber or elastomer, for example.

According to the ninth embodiment, the adsorption unit is constituted only by the adsorption member 65, omitting the outer case. In one example, the adsorption member 65 is formed into an arc-shaped or C-ring shape having a desired thickness and width, and has an arc-shaped inner circumferential surface, an arc-shaped outer circumferential surface, arc-shaped upper and lower surfaces, and a pair of end surfaces joined to the upper surface and lower surface, respectively, as an adsorption surface 65a. The adsorption surface 65a has a diameter and width (axial width) corresponding to the outer circumferential surface of the cushioning member 62.

The adsorption member 65 is attached to the cushioning member 62 and covers the outer circumferential surface of the cushioning member 62 except for the second contact surface S2. The adsorption surface 65a is in contact with the outer circumferential surface of the cushioning member 52.

As described above, in the ninth embodiment as well configured such that the inner stopper 50 and the outer stopper 60 are provided on the support sleeves 38a and 38b, advantageous operation effects similar to those of the first embodiment described above can be obtained. In other words, in the eighth embodiment as well, outgassed materials generated from the cushioning members 52 and 62 can be directly and efficiently adsorbed by the adsorption members 55 and 65, and the amount of outgassed materials diffused in the housing can be significantly reduced. Further, according to the ninth embodiment, the outer case is omitted, and therefore the number of parts can be reduced.

Tenth Embodiment

FIG. 27 is a perspective view of the inner stopper 50 of the HDD according to the tenth embodiment.

As shown in the figure, according to the tenth embodiment, the adsorption unit of the inner stopper 50 is constituted by only the adsorption member 55, omitting the outer case. The adsorption member 55 is configured to cover the upper end surface 52a of the cushioning member 52 in addition to the outer circumferential surface of the cushioning member 52. In other words, the adsorption member 55 includes an adsorption surface 55a in contact with the outer circumferential surface of the cushioning member 52 and an adsorption surface 55b in contact with the upper end surface 52a of the cushioning member 52, except for the first contact surface S1.

FIG. 30 is a perspective view showing the outer stopper 60 of the HDD according to the tenth embodiment.

As shown in the figure, according to the tenth embodiment, the adsorption unit of the outer stopper 60 is constituted by only the adsorption member 65, omitting the outer case. The adsorption member 65 is configured to cover the upper end surface 62a of the cushioning member 62 in addition to the outer circumferential surface of the cushioning member 62. In other words, the adsorption member 65 comprises an adsorption surface 65a in contact with the outer circumferential surface of the cushioning member 62 and an adsorption surface 65b in contact with the upper end surface 62a of the cushioning member 62, except for the second contact surface S2.

As described above, in the tenth embodiment as well configured such that the inner stopper 50 and the outer stopper 60 are provided on the support sleeves 38a and 38b, advantageous operation effects similar to those of the first embodiment described above can be obtained. In other words, in the eighth embodiment as well, outgassed materials generated from the cushioning members 52 and 62 can be directly and efficiently adsorbed by the adsorption members 55 and 65, and the amount of outgassed materials diffused in the housing can be significantly reduced. Further, the tenth embodiment is configured such that the adsorption members 55 and 56 cover the circumferential surface and end surfaces of the cushioning members 52 and 62, more outgassed materials can be adsorbed by the adsorption members 55 and 65, thereby making it possible to further reduce the amount of outgassed materials diffused in the housing. Furthermore, according to the tenth embodiment, the outer case is omitted, and therefore the number of parts can be reduced.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined as appropriate.

FIG. 31 is a table diagram indicating examples 11 to 26 each constituted by a combination of various embodiments. Note that in FIG. 31, the cushioning members are not listed, but it is only natural that each of the examples includes a cushioning member.

In Example 11, the inner stopper includes a stopper pin and an adsorption member, and the outer stopper includes a stopper pin and an adsorption member.

In Example 12, the inner stopper includes a stopper pin and an adsorption member, and the outer stopper includes a stopper pin, an adsorption member, and an outer case.

In Example 13, the inner stopper includes a stopper pin, an adsorption member, and an outer case, and the outer stopper includes a stopper pin and an adsorption member.

In Example 14, the inner stopper includes a stopper pin, an adsorbent, and an outer case, and the outer stopper includes a stopper pin, an adsorbent, and an outer case.

In Example 15, the inner stopper includes a support sleeve and an adsorption member, and the outer stopper includes a support sleeve and an adsorption member.

In Example 16, the inner stopper includes a support sleeve and an adsorption member, and the outer stopper includes a support sleeve, an adsorption member, and an outer case.

In Example 17, the inner stopper includes a support sleeve, an adsorption member, and an outer case, and the outer stopper includes a support sleeve and an adsorption member.

In Example 18, the inner stopper includes a support sleeve, an adsorbent, and an outer case, and the outer stopper includes a support sleeve, an adsorbent, and an outer case.

In Example 19, the inner stopper includes a stopper pin and an adsorbent, and the outer stopper includes a support sleeve and an adsorbent.

In Example 20, the inner stopper includes a stopper pin and an adsorption member, and the outer stopper includes a support sleeve, an adsorption member, and an outer case.

In Example 21, the inner stopper includes a stopper pin, an adsorption member, and an outer case, and the outer stopper includes a support sleeve and an adsorption member.

In Example 22, the inner stopper includes a stopper pin, an adsorbent, and an outer case, and the outer stopper includes a support sleeve, an adsorbent, and an outer case.

In Example 23, the inner stopper includes a support sleeve and an adsorbent, and the outer stopper includes a stopper pin and an adsorbent.

In Example 24, the inner stopper includes a support sleeve and an adsorption member, and the outer stopper includes a stopper pin, an adsorption member, and an outer case.

In Example 25, the inner stopper includes a support sleeve, an adsorption member, and an outer case, and the outer stopper includes a stopper pin and an adsorption member.

In Example 26, the inner stopper includes a support sleeve, an adsorption member, and an outer case, and the outer stopper includes a support sleeve, an adsorption member, and an outer case.

In the various embodiments described above, the cushioning member is not limited to a cylindrical shape, but various shapes can be selected. The cushioning member need only have a contact portion that is brought into contact with the actuator assembly. Further, the adsorption member or adsorption unit may not necessarily be provided on both the inner and outer stoppers, but may be provided on only one of the stoppers. In this case as well, the advantageous effect of reducing the amount of outgassed material diffused can still be obtained.

What is claimed is:

1. A disk device comprising:

a disk-shaped recording medium;

an actuator assembly provided to be rotatable and supporting a magnetic head; and a first stopper and a second stopper, arranged contactable with the actuator assembly, wherein at least one of the first stopper and the second stopper comprises a cushioning member including a contact surface contactable with the actuator assembly, and a gas adsorption member provided to surround the cushioning member except for the contact surface.

2. The disk device of claim 1, wherein the cushioning member includes a circumferential surface including the contact surface, and the gas adsorption member includes an adsorption surface covering the circumferential surface except for the contact surface.

3. The disk device of claim 2, wherein the adsorption surface is in contact with the circumferential surface.

4. The disk device of claim 1, wherein the cushioning member includes a circumferential surface including the contact surface and an end surface, and the gas adsorption member includes a first adsorption surface covering the circumferential surface except for the contact surface and a second adsorption surface covering the end surface.

5. The disk device of claim 2, wherein the at least one stopper comprises an outer case covering the outer surface of the gas adsorption member except for the adsorption surface.

6. The disk device of claim 1, wherein the at least one stopper includes a stopper pin and the cushioning member attached to the stopper pin.

7. The disk device of claim 1, wherein the at least one stopper includes a support sleeve and the cushioning member attached to the support sleeve.

* * * * *